United States Patent
Kim et al.

(10) Patent No.: US 10,273,924 B2
(45) Date of Patent: Apr. 30, 2019

(54) APPARATUS FOR CONTROLLING MILD HYBRID VEHICLE AND METHOD OF USING THE MILD HYBRID VEHICLE

(71) Applicant: HYUNDAI MOTOR COMPANY, Seoul (KR)

(72) Inventors: Hyun Kim, Hwaseong-si (KR); Ki Hong Kang, Gwangmyeong-si (KR); Sung Il You, Gwacheon-si (KR); Hwa Yong Jang, Hwaseong-si (KR); Yong Ug Kim, Anyang-si (KR); YoungMin Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 110 days.

(21) Appl. No.: 15/264,806

(22) Filed: Sep. 14, 2016

(65) Prior Publication Data
US 2017/0159558 A1 Jun. 8, 2017

(30) Foreign Application Priority Data
Dec. 8, 2015 (KR) .......................... 10-2015-0174268

(51) Int. Cl.
*F02B 63/04* (2006.01)
*F02N 11/08* (2006.01)
(Continued)

(52) U.S. Cl.
CPC .......... *F02N 11/0851* (2013.01); *F01L 1/344* (2013.01); *F02D 13/0207* (2013.01);
(Continued)

(58) Field of Classification Search
CPC .. F02N 11/0851; F02N 11/04; F02D 13/0207; F02D 41/221; F02D 2041/001;
(Continued)

(56) References Cited

U.S. PATENT DOCUMENTS 4,335,429 A * 6/1982 Kawakatsu ............ B60K 6/387
180/65.23
6,006,707 A * 12/1999 Ito ........................ F01L 1/34406
123/90.15
(Continued)

FOREIGN PATENT DOCUMENTS

| JP | 2006-001531 A | 1/2006 |
| JP | 4200633 B2 | 12/2008 |
| JP | 5082922 B2 | 11/2012 |
| KR | 10-0569079 B1 | 4/2006 |

OTHER PUBLICATIONS

Il Kwon Lee, et al., Study for Failure Examples of Computer on Engine Electronic Control System in LPG vehicle, The Korean Institute of Gas, Oct. 2009, p. 227-237. (w/ English introduction).

*Primary Examiner* — David E Hamaoui
*Assistant Examiner* — Susan E Scharpf
(74) *Attorney, Agent, or Firm* — Morgan Lewis & Bockius LLP

(57) ABSTRACT

An apparatus for controlling a mild hybrid vehicle includes an engine including a plurality of combustion chambers for generating driving torque by burning fuel, at least one intake valve and at least one exhaust valve for opening and closing each of the combustion chambers, an MHSG (mild hybrid starter and generator) for assisting the driving torque of the engine and selectively being operated as a generator, a VVA (variable valve apparatus) including an oil control valve that changes a direction of a path for flowing engine oil in order to adjust opening timing, lift, and duration of the intake valve and the exhaust valve, and a controller operating the MHSG to assist the engine torque when the oil control valve is faulty.

8 Claims, 3 Drawing Sheets

(51) Int. Cl.
*F02D 41/22* (2006.01)
*F02D 13/02* (2006.01)
*F01L 1/344* (2006.01)
*F02N 11/04* (2006.01)
*F02D 41/00* (2006.01)

(52) U.S. Cl.
CPC .. *F02D 41/221* (2013.01); *F01L 2001/34426* (2013.01); *F01L 2800/11* (2013.01); *F02D 2041/001* (2013.01); *F02D 2041/227* (2013.01); *F02D 2250/24* (2013.01); *F02N 11/04* (2013.01); *Y02T 10/18* (2013.01); *Y02T 10/40* (2013.01)

(58) Field of Classification Search
CPC ........... F02D 2041/227; F02D 2250/24; Y02T 10/18; Y02T 10/40; F01L 1/344; F01L 2001/34426; F01L 2800/01
USPC ........................................................ 701/103
See application file for complete search history.

(56) References Cited

U.S. PATENT DOCUMENTS

| | | | | |
|---|---|---|---|---|
| 6,405,697 | B2* | 6/2002 | Mikame | F01L 1/34406 123/90.15 |
| 6,718,921 | B2* | 4/2004 | Grewal | F01L 1/344 123/196 A |
| 8,136,616 | B2* | 3/2012 | Padilla | F01L 1/34 123/90.16 |
| 8,215,285 | B2* | 7/2012 | Nakamura | F01L 1/022 123/346 |
| 8,676,433 | B2* | 3/2014 | Endo | F16H 61/12 477/97 |
| 9,527,501 | B2* | 12/2016 | Asami | B60W 20/10 |
| 2006/0272608 | A1* | 12/2006 | Hara | F01L 13/0015 123/182.1 |
| 2010/0122861 | A1* | 5/2010 | Padilla | F01L 1/34 180/65.28 |
| 2012/0222652 | A1* | 9/2012 | Ando | B60K 6/445 123/347 |
| 2016/0160775 | A1* | 6/2016 | Endo | F02P 5/1504 123/2 |

\* cited by examiner

APPARATUS FOR CONTROLLING MILD HYBRID VEHICLE AND METHOD OF USING THE MILD HYBRID VEHICLE

CROSS-REFERENCE TO RELATED APPLICATION

This application claims the benefit of priority to Korean Patent Application No. 10-2015-0174268, filed with the Korean Intellectual Property Office on Dec. 8, 2015, the entire contents of which are incorporated herein by reference.

TECHNICAL FIELD

The present disclosure relates to an apparatus and a method for controlling a mild hybrid vehicle. More particularly, the present disclosure relates to an apparatus and a method for controlling a mild hybrid vehicle that can prevent stoppage of an engine when an oil control valve of a variable valve apparatus is faulty.

BACKGROUND

As is generally known in the art, a hybrid electric vehicle uses an internal combustion engine and a battery power source for power. The hybrid electric vehicle efficiently combines torque of the internal combustion engine and torque of a motor.

The hybrid electric vehicle may be divided into a hard type and a mild type according to a power sharing ratio between the engine and a motor. In the case of the mild type of hybrid electric vehicle (hereinafter referred to as a mild hybrid electric vehicle), an integrated starter & generator (ISG) configured to start the engine or generate electricity according to an output of the engine is used instead of an alternator. In the case of the hard type of hybrid electric vehicle, a driving motor for generating driving torque is used in addition to the ISG. The integrated starter & generator may refer to a hybrid starter & generator (HSG).

The mild hybrid electric vehicle may not provide a driving mode in which torque of the ISG is used as main driving torque, but the ISG may assist torque of the engine according to running states of the vehicle and may also charge a battery through regenerative braking. Accordingly, energy efficiency of the mild hybrid electric vehicle may be improved.

In general, internal combustion engines, which are apparatuses that generate power by receiving air and fuel and burning them in a combustion chamber, include an intake valve for drawing the air and fuel into the combustion chamber and an exhaust valve for discharging exhaust gas formed in the combustion chamber. The intake valve and the exhaust valve are opened or closed by rotation of a camshaft that rotates according to rotation of a crankshaft.

It is required to make timing of opening/closing the valves different in accordance with engine speed, engine load, and the like depending on traveling conditions of a vehicle in order to increase efficiency of the engine.

In particular, the timing of opening/closing the intake valve has a large influence on an efficiency of an engine. That is, when the intake valve is opened in advance, since an overlap period of the valves increases and intake/exhaust inertia flow can be sufficiently used at a high speed, the efficiency of the engine increases, but at a low speed, the efficiency decreases since the amount of remaining gas increases, thus a discharge amount of HC (hydrocarbons) increases.

Therefore, a technology that does not set an overlap period of the valves of a camshaft in accordance with the rotation of the camshaft to appropriately control valve timing in accordance with a driving state of the engine has been developed and applied, and is referred to as a CVVT.

The CVVT apparatus includes a continuously variable valve timing unit, an oil control valve (OCV) that is an oil supply device, an oil temperature sensor (OTS), an oil control valve filter, an oil path, an automatic tensioner, etc.

The OCV is a core device of the CVVT apparatus, and controls the valve opening/closing time by changing a path of engine oil which is supplied from an oil pump and flows in the continuously variable valve timing unit according to control from an engine electronic control unit (ECU).

If the oil control valve is short-circuited, air is over-supplied to the combustion chamber or the engine is stopped.

Conventionally, to solve such problems, a method that increases engine torque by increasing engine RPM has been used. Although an air amount supplied to the combustion chamber, ignition timing, or a fuel amount supplied to the combustion chamber is controlled in order to control the engine torque, a physical time delay to control the air amount, the ignition timing, or the fuel amount occurs, and thus the engine may stop due to the time delay.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for controlling a mild hybrid vehicle that can prevent stoppage of an engine when an oil control valve of a variable valve timing apparatus is faulty.

An apparatus for controlling a mild hybrid vehicle according to an exemplary embodiment of the present disclosure may include: an engine including a plurality of combustion chambers generating driving torque by burning fuel, at least one intake valve and at least one exhaust valve for opening and closing each of the combustion chambers; an MHSG (mild hybrid starter and generator) for assisting the driving torque of the engine and selectively being operated as a generator; a VVA (variable valve apparatus) including an oil control valve that changes a direction of a path for flowing engine oil in order to adjust opening timing, lift, and duration of the intake valve and the exhaust valve; and a controller for operating the MHSG to assist the engine torque when the oil control valve is faulty.

The controller may determine that the oil control valve is faulty when an abnormal ground signal of the oil control valve is inputted for a predetermined time.

The controller may increase engine torque and engine speed by operating the MHSG.

The controller may stop the operation of the MHSG when a release condition for stopping the operation of the MHSG is satisfied.

The release condition may be satisfied when a predetermined time passes after the MHSG is operated.

A method for controlling a mild hybrid vehicle including an engine including at least one intake valve and at least one exhaust valve for selectively opening and closing a combustion chamber, an MHSG (mild hybrid starter and generator) for assisting driving torque of the engine and selectively being operated as a generator, and an oil control valve that changes a direction of a path for flowing engine oil in order to adjust opening timing, lift, and duration of the intake valve and the exhaust valve according to another exemplary embodiment of the present disclosure may include: determining whether the engine is operated, by a controller; determining whether the oil control valve is faulty, by the controller; and supporting engine torque by operating the MHSG (mild hybrid starter and generator) when the oil control valve is faulty, by the controller.

It may be determined that the oil control valve is faulty when a ground signal of the oil control valve is inputted for a predetermined time.

The method may further include determining whether a release condition for stopping operation of the MHSG is satisfied, and stopping the operation of the MHSG when the release condition is satisfied.

The release condition may be satisfied when a predetermined time passes after the MHSG is operated.

According to an exemplary embodiment of the present disclosure, engine speed is increased by an MHSG (mild hybrid starter and generator), and thus stoppage of an engine can be prevented when an oil control valve of a variable valve timing apparatus is faulty.

BRIEF DESCRIPTION OF THE DRAWINGS

The drawings are provided for reference when describing exemplary embodiments of the present disclosure, and the spirit of the present disclosure should not be construed only by the accompanying drawings.

DETAILED DESCRIPTION

Figure 1:
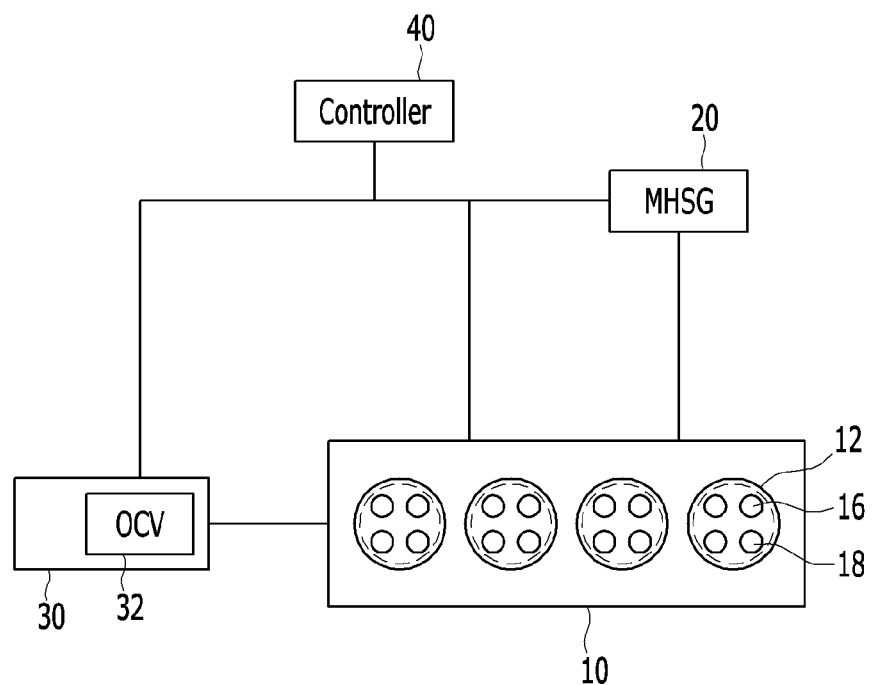
FIG. 1 is a schematic view illustrating a mild hybrid vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Throughout the specification, unless explicitly described to the contrary, the word "comprise" and variations such as "comprises" or "comprising" will be understood to imply the inclusion of stated elements but not the exclusion of any other elements.

Parts not related to the description of the exemplary embodiments are not shown to make the description clear, and like reference numerals designate like elements throughout the specification.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum).

Additionally, it is understood that the exemplary processes may be performed by one or a plurality of controllers. It is understood that the term controller/control unit refers to a hardware device that includes a memory and a processor. The memory is configured may be store modules, and the processor may be specifically configured to execute said modules to perform one or more processes which are further described below.

Furthermore, control logic of the present disclosure may be embodied as non-transitory computer readable media on a computer readable medium containing executable program instructions executed by a processor, a controller/control unit, or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion, e.g., by a telematics server or a controller area network (CAN).

Hereinafter, an apparatus for controlling a mild hybrid vehicle according to an exemplary embodiment of the present disclosure will be described in detain with reference to accompanying drawings.

FIG. 1 is a schematic view illustrating a mild hybrid vehicle according to an exemplary embodiment of the present disclosure.

As shown in FIG. 1, an apparatus for controlling a mild hybrid vehicle according to an exemplary embodiment of the present disclosure may include an engine 10, an MHSG (mild hybrid starter and generator) 20, a variable valve apparatus (VVL) 30 and a controller 40.

The engine 10 may include a plurality of combustion chambers 12 generating driving torque for driving a vehicle by burning fuel. The engine includes at least one intake valve 16 that opens and closes the combustion chamber 12 for supplement of fuel and air, and at least one exhaust valve 18 that is opened and closed for discharging of exhaust gas generated at the combustion chamber 12.

The MHSG (mild hybrid starter and generator) 20 receives power from a battery through an inverter, starts the engine 10, and assists engine torque. That is, the MHSG 20 is a kind of motor, and since the MHSG 20 is connected to a crankshaft of the engine 10 through a belt, the MHSG 20 may output torque to the crankshaft of the engine 10 and may assist the engine torque and the engine speed. The MHSG 20 is operated as a generator and generates regenerative energy when the vehicle is coasting or braking, and the regenerative energy is charged in the battery. That is, the engine torque transmitted from the engine 10 to the MHSG 20 through the crankshaft is converted to the regenerative energy by the MHSG 20 and the regenerative charges the battery.

The battery is electrically connected to the MHSG 20 and stores electric energy for operating the MHSG 20. The battery supplies electrical energy to the MHSG 20 when the MHSG 20 assists the engine torque, and the battery charges with electrical energy generated by the MHSG 20 during regenerative braking. The battery according to an exemplary embodiment of the present disclosure may be a 48 V battery.

The variable valve apparatus 30 adjusts opening timing, lift, or duration of the intake valve 16 and the exhaust valve 18. The variable valve apparatus 30 may include a VVT (variable valve timing) apparatus adjusting opening timing of the intake valve 16 and the exhaust valve 18, a VVL (variable valve lift) apparatus adjusting lift of the intake valve 16 and the exhaust valve 18, and a VVD (variable valve duration) apparatus adjusting duration of the intake valve 16 and the exhaust valve 18.

The variable valve apparatus 30 may include an OCV (oil control valve) 32, and the opening timing, the lift, and the duration of the intake valve 16 and the exhaust valve 18 are adjusted by the OCV 32. The oil control valve 32 may be operated by a control signal of the controller 40.

That is, the oil control valve 32 may be controlled by the controller 40 electrically connected to the oil control valve 32. The oil control valve 32 changes a direction of a path for flowing engine oil, and thus the opening timing, the lift, and the duration of the valves (intake valve 16 and exhaust valve 18) are adjusted.

The controller 40 controls the operation of the engine 10, the MHSG 20, and the variable valve apparatus 30.

For these purposes, the controller 40 may be implemented as at least one processor that is operated by a predetermined program, and the predetermined program may be programmed in order to perform each step of a method for controlling a mild hybrid vehicle according to an exemplary embodiment of the present disclosure.

The aforementioned various exemplary embodiments may be embodied in a recording medium which can be read by a computer or a similar device thereof by using, for example, software, hardware or a combination thereof.

According to the hardware embodiment, the aforementioned exemplary embodiments may be embodied by using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and electrical units performing other functions.

According to the software embodiment, exemplary embodiments such as procedures and functions described in the present specification may be embodied by separate software modules. The software modules may each perform one or more functions and operations described in the present specification. A software code may be embodied by a software application written in an appropriate program language.

The controller 40 may operate the MHSG 20 and assist engine torque with torque of the MHSG 20. Since the opening timing, the lift, and the duration of the intake valve 16 and exhaust valve 18 are not operated according to control of the controller 40 when the oil control valve 32 is faulty, combustion stability may deteriorate and precise engine torque may not be outputted according to the control of the controller 40. In this case, there is a problem that the engine 10 may be stopped.

The controller 40 may determine whether the oil control valve 32 is faulty from a ground signal of the oil control valve 32. The controller 40 may determine that the oil control valve 32 is faulty when the ground signal of the oil control valve 32 is abnormally inputted for a predetermined time (for example, the ground signal is beyond a predetermined range for a predetermined time).

In order to prevent stoppage of the engine 10, the controller 40 may operate the MHSG 20 and assist the engine torque through the MHSG 20. In detail, when the oil control valve 32 is faulty, the controller 40 may increase engine speed and engine torque by operating the MHSG 20.

In order to increase the engine speed and the engine torque for preventing stoppage of the engine 10, an air amount/fuel amount supplied to the engine 10 and ignition timing may be appropriately controlled. If the air amount/fuel amount supplied to the engine 10 and ignition timing are adjusted, physical time delay occurs and the engine 10 may be stopped due to the time delay.

However, when the engine speed and the engine torque are assisted by the MHSG 20, since the responsiveness of the MHSG 20 is very fast, time delay hardly occurs and it may be possible to prevent stoppage of the engine 10.

Hereinafter, a method for controlling a mild hybrid vehicle according to an exemplary embodiment of the present disclosure will be described in detail with reference to accompanying drawings.

Figure 2:
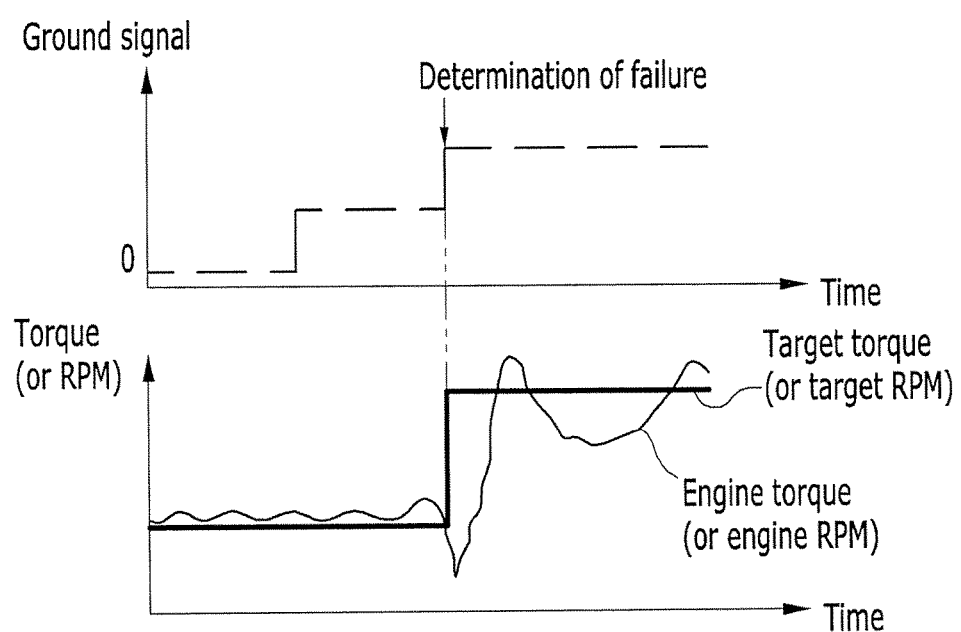
FIG. 2 is a graph illustrating control signals according to an exemplary embodiment of the present disclosure.
Figure 3:
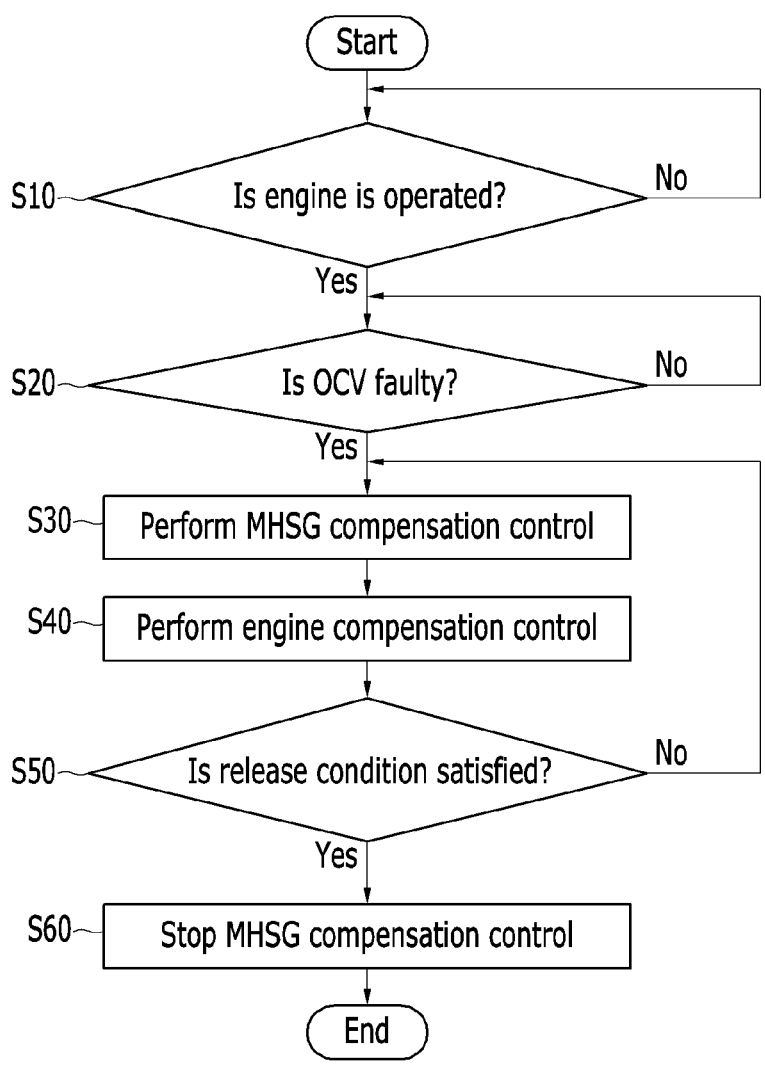
FIG. 3 is a flowchart illustrating a method for controlling the mild hybrid vehicle according to an exemplary embodiment of the present disclosure.

FIG. 2 is a graph illustrating control signals according to an exemplary embodiment of the present disclosure. FIG. 3 is a flowchart illustrating a method for controlling the mild hybrid vehicle according to an exemplary embodiment of the present disclosure.

As shown in FIG. 2 and FIG. 3, the controller 40 may determine whether the engine 10 is operated at step S10.

When the engine 10 is operated, the controller 40 may determine whether the oil control valve 32 is faulty at step S20. When the ground signal of the oil control valve 32 is abnormally inputted for a predetermined time, the controller 40 may determine that the oil control valve 32 is faulty.

When the oil control valve 32 is faulty, the controller may perform MHSG compensation control that operates the MHSG 20 and assist the engine torque and the engine speed by the MHSG 20 at step S30. If the oil control valve 32 is faulty, combustion stability of the engine 10 may deteriorate. Therefore, since the engine speed and the engine torque may not follow a target speed and a target torque, it may be needed to increase the engine speed and the engine torque using the MHSG 20 in order to obtain a torque margin and a speed margin.

As shown in FIG. 2, when the oil control valve 32 is faulty, the controller 40 may increase the target torque and the target speed corresponding to the torque margin and the speed margin, and the controller 40 may control the MHSG 20 in which the engine torque and the engine speed corresponding to the torque margin and the speed margin are outputted by the MHSG 20.

Since responsiveness of the MHSG 20 is very fast, if the engine torque and the engine speed are assisted by the MHSG 20, then the engine torque and the engine speed may be rapidly increased. Therefore, it may be possible to prevent stoppage of the engine 10.

The controller 40 may perform engine compensation control in which the target torque and the target speed should be constantly outputted at step S40. That is, the controller 40 may control an air amount/fuel amount supplied to the combustion chamber 12 and ignition timing such that the engine torque and the engine speed corresponding to the target torque and the target speed are outputted.

The controller 40 may determine whether a release condition for stopping the operation of the MHSG 20 is satisfied at step S50. The release condition may be satisfied when a predetermined time passes after the MHSG compensation control is performed.

When the release condition is satisfied, the controller 40 may stop the MHSG compensation control at step S60. That is, when the release condition is satisfied, since the engine torque and the engine speed are constantly outputted by the engine compensation control, the controller 40 may stop the MHSG compensation controls.

As described above, since the engine torque and the engine speed are assisted by the MHSG 20 when the oil control valve 32 is faulty, deterioration of combustion stability caused by failure of the oil control valve 32 can be prevented. Thus, a problem that the engine torque does not follow the target can be avoided, and thus the stoppage of the engine 10 occurring from the deterioration and the problem can be solved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for controlling a mild hybrid vehicle, comprising:
    an engine including a plurality of combustion chambers for generating driving force by burning fuel,
    at least one intake valve and at least one exhaust valve for opening and closing each of the combustion chambers;
    an MHSG (mild hybrid starter and generator) for assisting engine torque by receiving the driving force, and selectively being operated as a generator when coasting or braking of the vehicle occurs;
    a VVA (variable valve apparatus) including an oil control valve that changes a direction of a path for flowing engine oil in order to adjust opening timing, lift, and duration of the intake valve and the exhaust valve; and
    a controller operating the MHSG to assist the engine torque when the oil control valve is faulty,
    wherein, when the oil control valve is faulty, the controller increases a target torque and a target speed corresponding to a torque margin and a speed margin, and the controller controls the MHSG in which the engine torque and the engine speed corresponding to the torque margin and the speed margin are outputted by the MHSG.

2. The apparatus of claim 1, wherein the controller determines that the oil control valve is faulty when an abnormal ground signal of the oil control valve is inputted for a predetermined time.

3. The apparatus of claim 1, wherein the controller stops the operation of the MHSG when a release condition for stopping the operation of the MHSG is satisfied.

4. The apparatus of claim 3, wherein the release condition is satisfied when a predetermined time passes after the MHSG is operated.

5. A method for controlling a mild hybrid vehicle including an engine including at least one intake valve and at least one exhaust valve for selectively opening and closing a combustion chamber according to rotation of a crankshaft, an MHSG (mild hybrid starter and generator) assisting engine torque and selectively being operated as a generator when coasting or braking of the vehicle occurs, and an oil control valve that changes a direction of a path for flowing engine oil in order to adjust opening timing, lift, and duration of the intake valve and the exhaust valve, the method comprising:
    by a controller, determining whether the engine is operated;
    by the controller, determining whether the oil control valve is faulty; and
    by the controller, supporting the engine torque by operating the MHSG (mild hybrid starter and generator) when the oil control valve is faulty,
    wherein, when the oil control valve is faulty, the controller increases a target torque and a target speed corresponding to a torque margin and a speed margin, and the controller controls the MHSG in which the engine torque and the engine speed corresponding to the torque margin and the speed margin are outputted by the MHSG.

6. The method of claim 5, wherein it is determined that the oil control valve is faulty when a ground signal of the oil control valve is inputted for a predetermined time.

7. The method of claim 5, further comprising determining whether a release condition for stopping operation of the MHSG is satisfied; and
    stopping the operation of the MHSG when the release condition is satisfied.

8. The method of claim 7, wherein the release condition is satisfied when a predetermined time passes after the MHSG is operated.

* * * * *